3,441,484
TERNARY AZEOTROPIC DISTILLATION OF
ALKOXYNITRILES
Richard Dean Teaney, Houston, Tex., assignor to Monsanto Company, St. Louis, Mo., a corporation of Delaware
Filed Aug. 1, 1967, Ser. No. 657,572
Int. Cl. B01d 3/14; C07c 121/38
U.S. Cl. 203—91          10 Claims

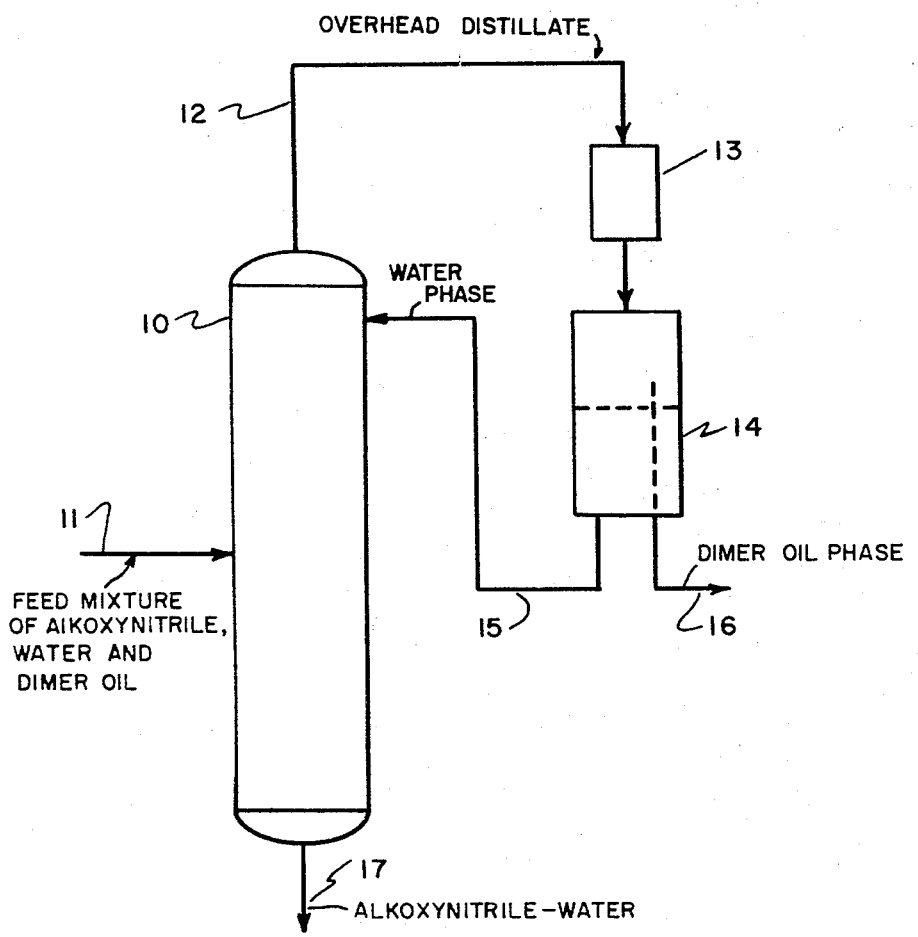

ABSTRACT OF THE DISCLOSURE

A process for the purification of a mixture of alkoxynitriles, dimer oil and water by distilling the mixture in a distillation zone wherein the overhead temperature is maintained from about 85 to 95° C. A ternary azeotrope containing small amounts of alkoxynitrile is removed overhead while a bottoms product is removed which is rich in alkoxynitrile.

BACKGROUND OF THE INVENTION

The present invention relates to a process for the recovery and purification of solvent alkoxynitriles. More particularly, the present invention relates to a process for the removal of polymeric impurities from solvent alkoxynitriles used in the separation of hydrocarbons according to the degree of unsaturation.

Alkoxynitriles, alone or combined with other solvents such as water, are useful for the separation of hydrocarbons of varying degrees of unsaturation by extractive distillation. These alkoxynitriles generally have the formula $$R_1-O-R_2-C\equiv N$$

wherein $R_1$ and $R_2$ are alkyl radicals. Most often, these alkyl radicals contain no greater than 5 carbon atoms. Usually, however, the alkyl radicals contain no greater than 3 carbon atoms. These alkyl radicals may be either straight-chain or branched-chain. The preferred alkoxynitriles for the practice of the present invention are those wherein $R_1$ and $R_2$ are a straight-chain alkyl radical of 1 to 3 carbon atoms. Included within this preferred group are such compounds as 3-methoxyacetonitrile, 3-ethoxyacetonitrile, 3 - propoxyacetonitrile, 3 - methoxypropionitrile, 3-ethoxypropionitrile, 3-propoxypropionitrile, 4-methoxybutyronitrile, 4-ethoxybutyronitrile and 4-propoxybutyronitrile. The most preferred of the alkoxynitrile solvents are 3-methoxypropionitrile and 3-ethoxypropionitrile.

One of the most serious problems encountered in the above-mentioned separation is that of the continuous accumulation of polymeric impurities in the alkoxynitrile solvent. The most serious problem is presented by the group of polymers which are dimeric polymers of diolefinic hydrocarbons and which are referred to in the art as dimer oils. These dimer oils generally are cyclic in nature and diethylenically unsaturated. It may be generally stated that dimer oil contains unsaturated polymeric hydrocarbon having a number of carbon atoms approximately twice that of the more unsaturated hydrocarbons contained in the hydrocarbon mixture being separated. For example, in the separation of a mixture of butane and butadiene, dimer oil comprises mainly vinylcyclohexene, which is a butadiene dimer. Dimer oils may be tolerated in solvent alkoxynitriles in small quantities, usually below three percent by weight, but in larger quantities are quite detrimental.

SUMMARY

It is now an object of the present invention to provide a new and novel process for the recovery and purification of alkoxynitriles. Another object of the present invention is to provide a new and improved process for the removal of polymeric impurities, particularly dimer oil, from alkoxynitriles used in the separation of hydrocarbons according to the degree of unsaturation. Another object of the present invention is to provide a new and improved process for the removal of dimer oil from alkoxynitriles used in the separation of butadiene from butenes and/or butanes by solvent extraction or extractive distillation. Additional objects will become apparent from the following description of the present invention.

These and other objects are accomplished by the present invention which in one of its embodiments is a process for the recovery of a fraction rich in alkoxynitriles from a feed mixture comprising alkoxynitriles, dimer oil, and water, which process comprises passing said feed mixture to a fractional distillational zone, maintaining the overhead temperature of said fractional distillation zone so as to have an overhead temperature at atmospheric pressure of about 85° C. to 95° C.,, removing a ternary azeotrope of alkoxynitrile, water and dimer oil as an overhead distillate, and removing a bottoms product richer in alkoxynitrile than said feed mixture. The present invention is based on the ternary azeotrope of an alkoxynitrile, water and dimer oil, which ternary azeotrope contains relatively insignificant quantities of alkoxynitrile. The ternary azeotrope generally contains about 29% by weight of water, 3% by weight of alkoxynitrile and 68% by weight of dimer oil. If the process conditions of the present invention are maintained, the ternary azeotrope containing only small portions of valuable alkoxynitrile solvent and relatively large portions of dimer oil may be taken as an overhead product. A bottoms product may be taken which is rich in alkoxynitriles and which is practically free of dimer oil. Water will also be in the bottoms product, the amount of water depending on the feed composition. As was pointed out above, the process conditions must be strictly controlled in order to take advantage of the ternary azeotrope since there are also competing binary azeotropes readily formed under conditions conducive to the formation of the ternary azeotrope. These binary azeotropes contain large percentages of alkoxynitrile and therefore a process operated under such conditions as to form these binary azeotropes results in large losses of valuable alkoxynitrile solvent.

DESCRIPTION OF THE PREFERRED EMBODIMENTS

The drawing represents one method of carrying out the present invention by continuous distillation. Reference is now made to the drawing in order to more fully describe the present invention. A feed mixture of water, dimer oil and alkoxynitrile enter distillation column 10 through line 11. An overhead distillate comprised of the ternary azeotrope is removed through line 12 and sent to condenser 13. In order to remove the ternary azeotrope as the overhead distillate, it is necessary to control the temperature at the top of column 10 at a temperature at atmospheric pressure of from about 85° C. to 95° C. From condenser 13, the overhead distillate passes to separator 14 wherein a dimer oil phase and water phase are formed, the water phase being the lower of the two phases. The small amount of solvent alkoxynitrile contained in the overhead distillate is distributed between these two phases with the major portion of the alkoxynitrile being in the water phase. The water phase is returned as reflux through line 15 to the top of distillation column 10 and the dimer oil phase is removed from separator 14 through line 16 where it is sent to waste disposal. The reflux ratio should generally be between 1:1 and 25:1; however, it is preferably between about 2:1 and 6:1.

From the bottom of distillation column 10 a stream consisting essentially of alkoxynitrile and water is removed through line 17 and recycled for use in the separation of hydrocarbons according to the degree of unsaturation.

The process of the drawing is merely illustrative and should not be taken in a limiting sense. For example, it is not necessary to separate the condensate into a dimer oil phase and a water phase before returning a reflux stream to the distillation column. Instead, the overhead distillate may merely be condensed and both phases returned as reflux. Also the present invention may be carried out using batch distillation instead of continuous distillation. Regardless of the particular distillation system, the overhead temperature is quite critical and therefore an overhead temperature at atmohpheric pressure of 85° C. to 95° C. must be maintained in order to utilize the ternary azeotrope in accordance with the present invention. Preferably the overhead temperature at atmospheric pressure is maintained from about 87° C. to 92° C. By "overhead temperature" as used herein is meant the temperature at or near the top of the distillation column and is the temperature at which the overhead distillate is removed.

The pressure at which the present process may be operated successfully includes subatmospheric, atmospheric, and superatmospheric pressures. Generally, as a matter of economics, the present invention will be practiced at pressures ranging from atmospheric up to 50 p.s.i.g., preferably about atmospheric pressure. Since the pressure obviously affects the boiling point of the ternary azeotrope, the overhead temperature which must be maintained in order to obtain the ternary azeotrope, i.e., a temperature at atmospheric pressure of 85° C. to 95° C., will vary somewhat from this range if a pressure other than atmospheric pressure is used. Therefore, such terms as temperature at atmospheric pressure of 85° C. to 95° C. are not intended as a limitation on the pressure under which the present invention is operated but merely a limitation on the temperature and is intended to cover corresponding overhead temperatures outside the 85° C. to 95° C. range when operating at other than atmospheric pressure.

The type of distillation column in which the present process is carried out is not particularly critical to the operation of the present invention. Conventional packed columns packed with various metallic packings, ceramic rings, or the like, may be used. Likewise distillation columns having a series of vapor-liquid contacting trays may be used. These tray columns may contain perforated trays, bubble-cap trays, or the like. In addition, combinations of these types of vapor-liquid contacting means may be used such as a column having packing above the feed point of the column and trays at points below the feed point. Whatever the manner used to provide the vapor-liquid contact, there should generally be at least eight theoretical tray equivalents in order to accomplish the separation of the present invention. Preferably about twelve to twenty theoretical tray equivalents are used.

The present invention may be applied to a feed mixture containing practically any proportions of water, dimer oil, and alkoxynitrile although it is most useful in the treatment of streams containing from 5 to 15 weight percent water, 75 to 93 weight percent alkoxynitrile, and 2 to 10 weight percent dimer oil. It is generally preferred to treat streams wherein dimer oil is one containing from six to ten carbon atoms obtained by dimerizing a $C_3$ to $C_5$ hydrocarbon, especially a butadiene dimer oil rich in vinylcyclohexene, and wherein the alkoxynitrile is 3-methoxypropionitrile or 3-ethoxypropionitrile.

In order to illustrate the present invention but not to limit the scope thereof, the following examples are given.

Example I

An impure solvent 3-methoxypropionitrile containing about 5% by weight of butadiene dimer oil consisting essentially of vinylcyclohexene, 87% by weight of 3-methoxypropionitrile and 8% by weight of water was continuously introduced into a 1" distillation column approximately 32 inches in height. The upper 24 inches of the column was packed with $\frac{1}{16}'' \times \frac{1}{16}''$ protruded metal packing and the lower 8 inches of the distillation column consisted of a 6-tray Oldershaw section. The feed was introduced between the packing and the Oldershaw trays. A total condenser was used with a reflux divider returning a portion of the total overhead distillate so as to maintain a reflux ratio of about 3:1. The bottoms product was taken continuously by level control of the pot. During the run, the feed temperature was maintained at about 52.3° C., the overhead temperature at 89.5° C., the bottoms temperature at 111.5° C., and the pressure at atmospheric.

An overhead product was taken which consisted of about 67.74% by weight of dimer oil, 4.43% by weight of 3-methoxypropionitrile and 27.83% by weight of water. The bottoms product, in weight percent, consisted of about 0.04% dimer oil, 93.79% 3-methoxypropionitrile and 6.17% water.

Example II

To demonstrate that the present invention may also be accomplished by batch distillation, a composition comprising about 90% by weight of 3-methoxypropionitrile, 5% by weight of vinylcyclohexene, and 5% by weight of water was placed in a stillpot. A 1" diameter column packed with $\frac{1}{16}'' \times \frac{1}{16}''$ protruded metal to a depth of 5 feet was used as the distillation column. Heat was applied to the stillpot and an overhead temperature of 90.5° C. was maintained while a stillpot temperature of 169.5° C. was maintained. The reflux ratio was 20:1. The distillate obtained was comprised of about 2% by weight of 3-methoxypropionitrile, 67% by weight of vinylcyclohexene, and 31% by weight of water.

The above examples clearly illustrate the manner of practicing the present invention as well as the surprising results obtained therefrom. Example I illustrates a continuous operation of the present invention while Example II illustrates that the invention may also be practiced by batch distillation.

What is claimed is:

1. A process for the recovery of a fraction rich in alkoxynitriles from a feed mixture comprising alkoxynitrile, dimer oil, and water, which process comprises passing said feed mixture to a fractional distillation zone, maintaining the overhead temperature of said fractional distillation zone so as to have an overhead temperature at atmospheric pressure of about 85° C. to 95° C., removing a ternary azeotrope of alkoxynitrile, water, and dimer oil as an overhead distillate, and removing a bottoms product richer in alkoxynitrile in said feed mixture.

2. The process of claim 1 wherein said dimer oil is one obtained by dimerizing a $C_3$ to $C_5$ diolefinic hydrocarbon and wherein said alkoxynitrile is of the formula $$R_1—O—R_2—C\equiv N$$

wherein $R_1$ and $R_2$ are a straight-chain alkyl radical of 1 to 3 carbon atoms.

3. The process of claim 2 wherein the overhead temperature of said distillation zone is maintained at a temperature at atmospheric pressure between about 87° C. and 92° C.

4. The process of claim 1 wherein said mixture comprises from about 75 to 93 percent by weight of alkoxynitrile, 2 to 10 percent by weight of dimer oil, and from 5 to 15 percent by weight of water.

5. The process of claim 1 wherein said fractional distillation zone is maintained at a pressure of from about atmospheric to 50 p.s.i.g.

6. The process of claim 1 wherein said alkoxynitrile is 3-methoxypropionitrile.

7. The process of claim 6 wherein said dimer oil is a butadiene dimer oil comprising mainly vinylcyclohexene.

8. The process of claim 7 wherein said fractional distillation zone is maintained at a pressure of from about atmospheric to 50 p.s.i.g.

9. The process of claim 8 wherein said mixture comprises from about 75 to 93 percent by weight of alkoxynitrile, 2 to 10 percent by weight of dimer oil, and from 5 to 15 percent by weight of water.

10. The process of claim 9 wherein said process is a continuous process.

References Cited

UNITED STATES PATENTS

| | | | |
|---|---|---|---|
| 2,511,653 | 6/1950 | Shand | 260—465.6 |
| 2,568,176 | 9/1951 | Vriens et al. | 260—465.6 |
| 2,794,042 | 5/1957 | Tanona et al. | 260—465.6 |
| 3,087,866 | 4/1963 | Burch | 203—53 |
| 3,312,602 | 4/1967 | Mattox et al. | 203—53 |

WILBUR L. BASCOMB, JR., *Primary Examiner.*

U.S. Cl. X.R.

203—53, 60, 68, 96; 260—465.6